United States Patent
Martin et al.

(10) Patent No.: US 9,646,737 B2
(45) Date of Patent: May 9, 2017

(54) BEARING RING, ELECTRICALLY INSULATING COATING AND METHOD FOR APPLYING AN ELECTRICALLY INSULATING COATING

(71) Applicants: Coatec GmbH, Schluechtern (DE); Schaeffler Technologies AG & Co. KG, Herzogenaurach (DE)

(72) Inventors: Gudrun Martin, Euerbach (DE); Georg Smolorz, Mittelstreu (DE); Markus Stefan Kirst, Buettelborn (DE); Jens Nikolai, Schluechtern (DE)

(73) Assignees: Coatec GmbH, Schluechtern (DE); Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/847,954

(22) Filed: Sep. 8, 2015

(65) Prior Publication Data
US 2015/0380124 A1    Dec. 31, 2015

Related U.S. Application Data

(63) Continuation of application No. PCT/IB2014/059616, filed on Mar. 11, 2014.

(30) Foreign Application Priority Data

Apr. 25, 2013 (DE) .................. 10 2013 104 186

(51) Int. Cl.
*H01B 3/12* (2006.01)
*F16C 33/62* (2006.01)
(Continued)

(52) U.S. Cl.
CPC ............. *H01B 3/12* (2013.01); *C23C 4/10* (2013.01); *C23C 4/11* (2016.01); *F16C 33/583* (2013.01);
(Continued)

(58) Field of Classification Search
CPC ........ F16C 19/06; F16C 33/583; F16C 33/586; F16C 33/62; F16C 33/64; F16C 2202/32;
(Continued)

(56) References Cited

U.S. PATENT DOCUMENTS 3,639,639 A * 2/1972 McCard ............... F16C 33/10
427/427
4,997,293 A * 3/1991 Ono ...................... F16C 19/00
384/476
(Continued)

FOREIGN PATENT DOCUMENTS

| CN | 1611803 A | 5/2005 |
| CN | 101421436 A | 4/2009 |

(Continued)

OTHER PUBLICATIONS

International Search Report from PCT/IB2014/059616, filed Mar. 11, 2014, mailed Jul. 22, 2014.

*Primary Examiner* — Marcus Charles
(74) *Attorney, Agent, or Firm* — Patentbar International, P.C.

(57) ABSTRACT

The invention discloses a bearing ring. The bearing ring, with a body, has an electrically insulating coating made up of a ceramic layer with pores and a plastic for filling the pores and coating the ceramic layer. According to the invention, the pores have a proportion between 10 and 50% in the ceramic layer. The invention furthermore defines an electrically insulating coating, made up of a ceramic layer with pores and a plastic for filling the pores and coating the ceramic layer. The invention further still discloses a method for applying an electrically insulating coating to a body of a bearing ring.

14 Claims, 2 Drawing Sheets

(51) Int. Cl.
*F16C 33/64* (2006.01)
*C23C 4/10* (2016.01)
*F16C 33/58* (2006.01)
*C23C 4/11* (2016.01)
*F16C 19/06* (2006.01)

(52) U.S. Cl.
CPC ............ *F16C 33/586* (2013.01); *F16C 33/62* (2013.01); *F16C 33/64* (2013.01); *F16C 19/06* (2013.01); *F16C 2202/30* (2013.01); *F16C 2206/42* (2013.01); *F16C 2206/58* (2013.01)

(58) Field of Classification Search
CPC .............. F16C 2206/42; F16C 2223/10; F16C 2206/58; F16C 2206/60; C23C 4/11; C23C 4/10; H01B 3/12
USPC ............ 384/276, 445, 492, 569, 625, 907.1, 384/912–913; 427/308, 320, 372.2, 427/376.3, 385.5, 454, 532; 29/898.066
See application file for complete search history.

(56) References Cited

U.S. PATENT DOCUMENTS

| | | | | |
|---|---|---|---|---|
| 6,422,756 B1 * | 7/2002 | Tanaka | ...................... | F16C 33/30 384/492 |
| 8,231,967 B2 * | 7/2012 | Nakano | ................. | C01B 33/113 428/307.3 |
| 2003/0107302 A1 * | 6/2003 | Birth | ..................... | H01L 41/053 310/344 |
| 2005/0084761 A1 * | 4/2005 | Hennige | ............... | H01M 2/162 429/247 |
| 2006/0078791 A1 * | 4/2006 | Hennige | ............. | H01M 2/1646 429/145 |
| 2009/0120358 A1 * | 5/2009 | Harada | ..................... | C23C 4/02 118/300 |
| 2009/0304318 A1 * | 12/2009 | Konno | .................... | F16C 19/52 384/492 |
| 2010/0183917 A1 * | 7/2010 | Holzapfel | ......... | H01M 10/0569 429/207 |
| 2012/0008890 A1 * | 1/2012 | Schwarz | ................. | F16C 33/62 384/476 |
| 2012/0251890 A1 * | 10/2012 | Pascaly | .............. | B01D 67/0046 429/251 |
| 2013/0084033 A1 * | 4/2013 | Martin | .................... | F16C 19/52 384/445 |

FOREIGN PATENT DOCUMENTS

| | | | | |
|---|---|---|---|---|
| CN | 102979813 A | | 3/2013 | |
| DE | 19631988 A1 | | 2/1998 | |
| DE | 10238941 A1 | * | 3/2004 | ............ D06M 11/45 |
| DE | 102009014753 A1 | | 9/2010 | |
| DE | 102010015155 A1 | | 10/2011 | |
| JP | 01240676 A | * | 9/1989 | ............. C23C 28/00 |
| JP | 01288618 A | * | 11/1989 | ............. F16C 33/62 |
| JP | H0552223 A | | 3/1993 | |
| JP | 2641010 B2 | * | 8/1997 | ............... H01G 4/12 |
| JP | 2002180233 A | * | 6/2002 | ............... F16C 33/62 |
| JP | 2007218368 A | * | 8/2007 | ............... F16C 33/62 |
| JP | 2011102646 A | * | 5/2011 | ............... F16C 33/58 |
| RU | 2319869 C2 | | 3/2008 | |
| RU | 126392 U1 | | 3/2013 | |

* cited by examiner

BEARING RING, ELECTRICALLY INSULATING COATING AND METHOD FOR APPLYING AN ELECTRICALLY INSULATING COATING

RELATED APPLICATIONS

This Application is a Continuation application of International Application PCT/IB2014/059616, filed Mar. 11, 2014, which in turn claims priority to German Patent Applications 10 2013 104 186.8, filed Apr. 25, 2013, filed Apr. 25, 2013, both of which are incorporated herein by reference in their entirety.

FIELD OF THE INVENTION

The present invention refers to a bearing ring.

Additionally, the invention refers to an electrically insulating coating.

Moreover, the invention relates to a method for applying an electrically insulating coating on a body of a bearing ring.

BACKGROUND OF THE INVENTION

Practical experience shows that a passage of current through a bearing can lead to a damage of the bearing. Therefore a need for electrically insulated bearings exists, particularly for electrically insulated bearing rings.

From prior art ceramic coatings are known that are provided as an electrically insulating coating on a metallic, and thus conductive body of a bearing ring, therefore suppressing the passage of electric current through the bearing, as is, for example, defined in the German patent application DE 10 2010 015 155 A1 or DE 10 2009 014 753 A1.

Furthermore electrically insulating coatings consist mostly of an aluminum oxide. The electrically insulating layer of aluminum oxide is very hard. However, the dielectric constant of this type of coating is higher than of insulating plastic materials.

In addition, such electrically insulating coatings are shock-sensitive and can burst easily, so that a small-grained ceramic material is mounted on a bearing in a manner through which a ceramic coating is formed with a proportion of pores considerably less than 10%. To prevent an ingression of moisture through the pores in the ceramic coating, the ceramic coating with its pores is sealed. The layer thickness of such electrically insulating coatings is, in practice, currently between 0.1 and 0.4 mm.

As there are currently many problems concerning the passage of high-frequency currents through bearings, an enhancement is needed to secure a better insulation against high-frequency currents.

SUMMARY OF THE INVENTION

An object of the present invention is therefore to modify a bearing ring in such a manner that a higher insulating performance against capacitative currents in a bearing is ensured.

This object is accomplished by a bearing ring that comprises:
a body;
an electrically insulating coating carried by the body, wherein the insulating coating is made up of a ceramic layer with a plurality of particles and a plurality of pores between the particles, wherein the pores in the ceramic layer have a proportion between 10 and 50%; and
a plastic material for filling the pores and for forming an additional coating on the ceramic layer.

Another object of the present invention is to create an electrically insulating coating that ensures a high insulating performance against high-frequency currents.

This object is achieved by an electrically insulating coating for use in a bearing ring, the coating, wherein the coating comprising:
a ceramic layer formed by a plurality of particles and a plurality of pores between the, wherein the pores in the ceramic layer have a proportion between 10 and 50%; and
a plastic material for filling the pores and for forming a coating on the ceramic layer.

An additional object of the present invention is to provide an easily executable method for providing an electrically insulating coating on the body of a bearing ring that protects the bearing against high-frequency currents.

This object is accomplished by a method for providing a bearing ring by applying an electrically insulating coating on a body of a bearing ring, comprising the following steps:
applying of a ceramic material on the body of the bearing ring in such a manner that a ceramic layer has a plurality of particles and plurality of pores between the particles wherein the pores are at a proportion between 10 and 50%;
applying of a plastic material to the ceramic layer, so that the pores are filled and the ceramic layer is coated; and
hardening the plastic material.

The inventive bearing ring with a body has an electrically insulating coating made up of a ceramic layer with pores and a plastic material for filling the pores and for forming a coating on the ceramic layer. In particular, the coating for filling the pores prevents an ingression of moisture into the pores. However, the dielectric constant of the plastic material is lower than that of the ceramic. According to the invention, the pores have a proportion between 10 and 50% in the ceramic layer. Through this layer structure the insulating property of the coating is substantially increased.

In a first embodiment of the invention, the ceramic layer consists of an oxide, for example aluminum oxide. In another embodiment, the ceramic layer consists of a combination of oxides, for example aluminum oxide containing a percentage of titan oxide. The term combination of oxides also comprises mixed oxides, therefore the ceramic layer can also consist of a spinel. In still another embodiment, the ceramic layer consists of a nitride. A ceramic layer consisting of nitride could consist of, for example, aluminum nitride.

In this invention, the particle size of single particles in the ceramic layer exceeds 25 µm.

In another embodiment of the invention, the plastic material is an insulating plastic material. Particularly, plastics materials such as resin, siloxane, polyester or acryl are used. A possible option is that the coating to seal the pores consists of a combination of said plastic materials.

Preferably, the electrically isolating coating can be provided on an outer face, two opposite side faces, a rounding formed between the outer face and each side face, and a bevel of the body of the bearing ring, the bevel running from each side face to an inner face of the bearing ring.

A layer thickness of the electrically insulating layer is 0.2 to 2.0 mm.

An advantage of the invention is the possibility of a considerably thicker electrically insulating layer on the bearing ring compared to the electrically insulating layer of prior mentioned standardized coating on the bearing ring due to the fact that the inventive coating is less brittle.

The thicker electrically insulating coating with its higher ratio of plastic material therefore provides, in comparison with the prior art described in the introduction, a substantially higher capacitive resistance, so that the isolating performance rises and therefore the bearing ring according to the invention enables an improved insulation against high-frequency currents in a bearing, such as for instance ball or roller bearings in a bearing. It is also important to note that in the invention the value of the dielectric constant is, in comparison to the fine pored ceramic layers known from prior art, favorable due to the higher portion of plastic material.

In the electrically insulating coating according to the invention, made up of a ceramic layer with pores and a plastic material to fill the pores and to form a coating of the ceramic layer, the pores in the ceramic layer have, according to the invention, a proportion between 10 and 50%.

Due to this composition of the materials it is possible to achieve a higher electrically insulating coating that also has a certain thickness, so that a higher insulating performance against high-frequency currents is given. The Isolating performance of a layer by high frequency currents is influenced by the layer thickness and the dielectric constant of the material used.

The inventive method for providing an electrically insulating coating on the body of a bearing ring comprises the following steps. First, the ceramic material is applied on the body of a bearing ring in such a manner that a ceramic layer is formed by a plurality of particles and plurality of pores between the particles, wherein the pores at a proportion between 10 and 50%. Subsequently, a plastic material is applied on the ceramic layer, so that the pores are filled and the ceramic layer is formed. Thereby, a better capacitive resistance is reached and moisture is prevented from entering through the pores. Finally, the plastic material for filling the pores and coating the ceramic layer is hardened.

Preferably, a radiation treatment to the body is carried out before applying the ceramic material, so that the ceramic layer, which is to be applied, is bonded in a form and material locking manner with the base material of the body.

Favorably, in the method according to the invention, the ceramic material is applied on the body of the bearing ring using a thermal spraying method.

BRIEF DESCRIPTION OF THE DRAWING

Below embodiments illustrate the invention and its advantages using the figures attached. The proportions in the figures do not always match the real proportions as some shapes are simplified and others, to better illustrate, are shown enlarged in comparison to other elements. Here.

DETAILED DESCRIPTION OF THE PREFERRED EMBODIMENTS

Figure 1:
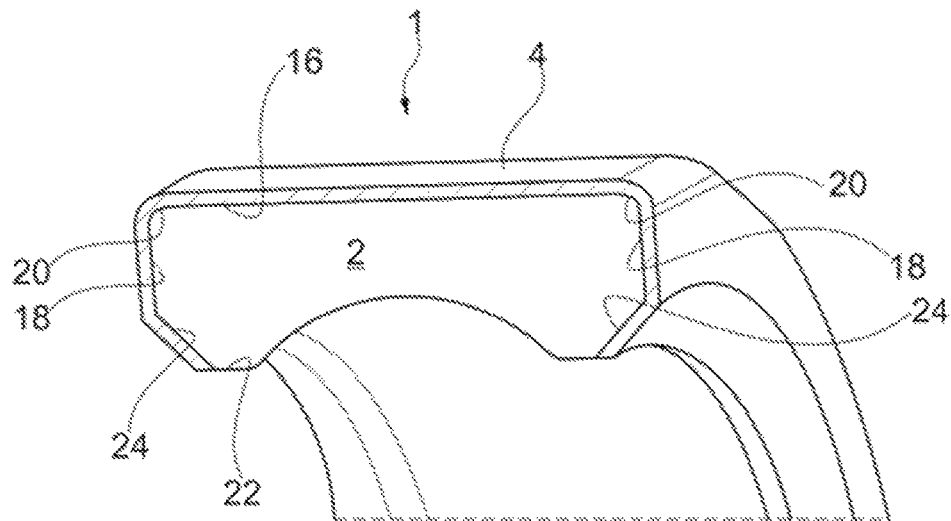
FIG. 1 shows a perspective view of a bearing ring according to the invention that shows an electrically insulating coating.

For identical elements of the invention or elements with the same function the same reference numerals are used. Further, for better understanding, only reference signs necessary for the description of the respective figure are depicted. The different embodiments shown are solely examples for the design of the bearing ring, the electrically insulating coating and the method for providing an electrically insulating coating according to the inventive method and therefore do not limit the invention.

Figure 2:
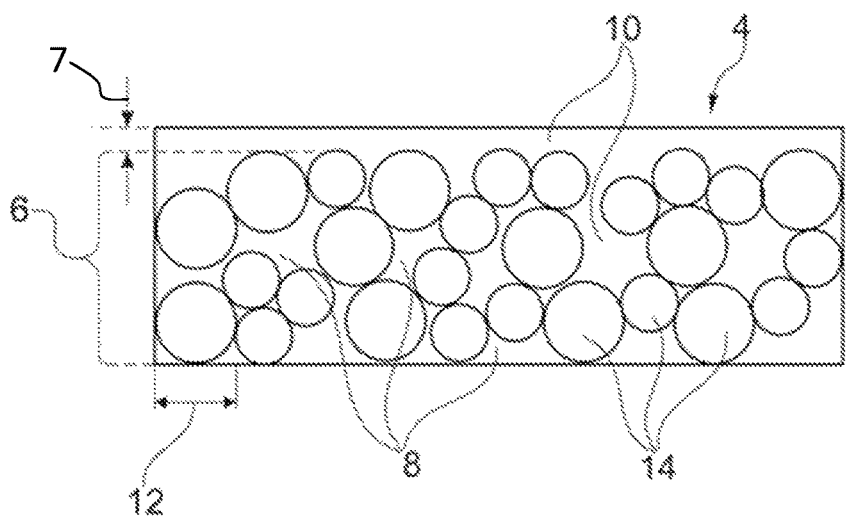
FIG. 2 shows a schematic depiction of the electrically insulating coating according to the invention.

FIG. 1 shows a perspective view of a bearing ring 1 according to the invention with a body 2 that carries an electrically insulating coating 4. The electrically insulating coating 4 consists, as shown in FIG. 2, of a ceramic layer 6 with pores 8 and a plastic material 10 to fill the pores 8 and coat the ceramic layer 6. The ceramic layer 6 comprises a plurality of particles 14 and the plurality of pores 8 are distributed between the particles 14.

As shown here, the electrically insulating coating 4 is provided on an outer face 16, two opposite side faces 18, a rounding 20 formed between the outer face 16 and each side face 18, and a bevel 24 of the body 2 of the bearing ring 1, the bevel 24 running from each side face 18 to an inner face 22 of the bearing ring 1.

FIG. 2 shows a schematic depiction of a detailed portion of the electrically insulating coating 4 according to the invention, that, as already described in FIG. 1, is made up of a ceramic layer 6 with pores 8 and a plastic material 10 for filling the pores 8 and to form a coating 7 on the ceramic layer 6. A particle size 12 of each particle 14 in the ceramic layer 6 is larger than 25 µm.

Figure 3:
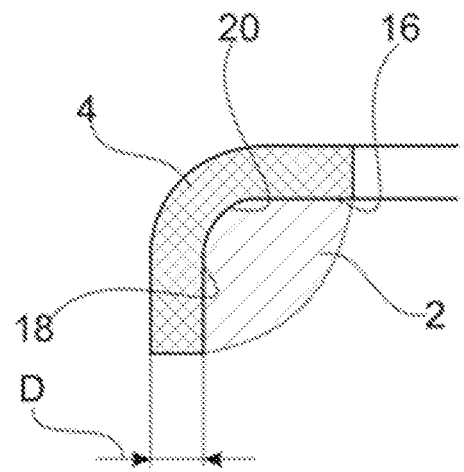
FIG. 3 shows a schematic depiction of the electrically insulating coating according to the invention, that is mounted on a bearing ring in the area of the rounding.
Figure 4:
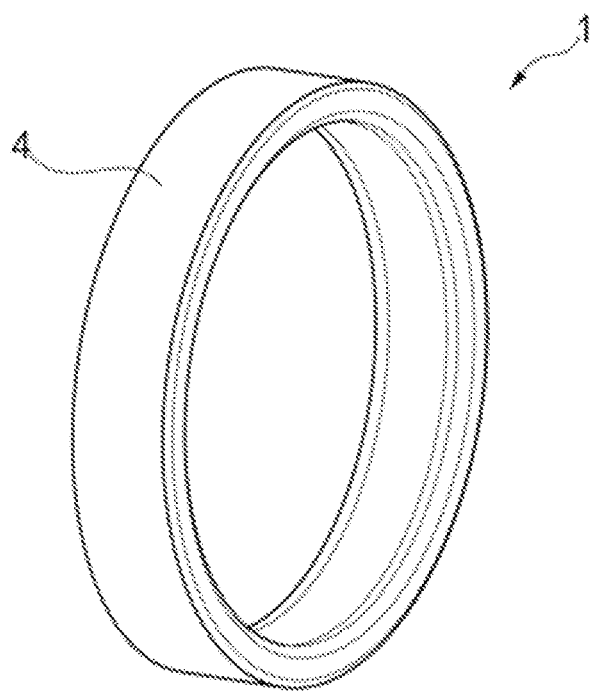
FIG. 4 shows a perspective view of a bearing ring according to the invention.

FIG. 3 shows a schematic depiction of a layer thickness D of the electrically insulating coating 4 provided on the body 2 of a bearing ring 1 (see FIG. 4). The layer thickness D can be between 0.2 to 2.0 mm, so that the invention creates a corresponding thick insulating layer, so that insulation against high frequency currents is ensured. Using the method according to the invention it is possible to apply an essentially constant coating thickness 20 on the outer face 16, the side face 18 and also on the rounding 20.

FIG. 4 shows a perspective view of a bearing ring 1 according to the invention. Here, the electrically insulating coating 4 is provided on an outer ring of the bearing ring 1. It is obvious to a person skilled in the art that the electrically insulating coating 4 according to the invention can also be applied to inner rings.

REFERENCE NUMERALS 1 bearing ring
2 body
4 electrically isolating coating
6 ceramic layer
7 coating
8 pore
10 plastic material
12 particle size
14 particle
16 outer face
18 side face
20 rounding
22 inner face
24 bevel
D layer thickness

What is claimed is:
1. A bearing ring comprising:
a body;
an electrically insulating coating carried by the body, wherein the insulating coating is made up of a ceramic layer with a plurality of particles and a plurality of pores between the particles, wherein the plurality of pores in the ceramic layer have a proportion between 10 and 50%; and a plastic material for filling the plurality of pores and for forming an additional coating on the ceramic layer.

2. The bearing ring according to claim 1, wherein the ceramic layer is selected from a group consisting of an oxide, a combination of oxides, a nitride and a spinel.

3. The bearing ring according to claim 1, wherein a particle size of single particles in the ceramic layer is larger than 25 µm.

4. The bearing ring according to claim 1, wherein the plastic material is an isolating plastic material.

5. The bearing ring according to claim 1, wherein the electrically insulating coating is applied on an outer face, two opposite side faces, a rounding formed between the outer face and each side face, and a bevel of the body of the bearing ring, the bevel running from each side face to an inner face of the bearing ring.

6. The bearing ring according to claim 1, wherein a layer thickness of the electrically insulating coating is between 0.2 mm and 2.0 mm.

7. An electrically insulating coating for use in a bearing ring, the coating comprising:

a ceramic layer formed by a plurality of particles and a plurality of pores between the particles, wherein the plurality of pores in the ceramic layer have a proportion between 10 and 50%; and a plastic material for filling the plurality of pores and for forming a coating on the ceramic layer.

8. The electrically insulating coating for use in a bearing ring according to claim 7, wherein the ceramic layer is selected from a group consisting of an oxide, a combination of oxides, a nitride and a spinel.

9. The electrically insulating coating for use in a bearing ring according to claim 7, wherein a particle size of single particles in the ceramic layer is larger than 25 µm.

10. The electrically insulating coating for use in a bearing ring according to claim 7, wherein the plastic material is an insulating plastic material.

11. A method for providing a bearing ring by for applying an electrically insulating coating on a body of the bearing ring, comprising the following steps:

applying of a ceramic material on the body of the bearing ring in such a manner that a ceramic layer has a plurality of particles and plurality of pores between the particles wherein the plurality of pores are at a proportion between 10 and 50%;

applying of a plastic material to the ceramic layer so that the plurality of pores are filled and the ceramic layer is coated; and hardening the plastic material.

12. The method according to claim 11, wherein a radiation treatment is carried out on the body before applying the ceramic material, so that the ceramic layer to be applied is bonded with the base material of the body in a form and material locking manner.

13. The method according to claim 11, wherein the ceramic material is applied to the body of the bearing ring by using a thermal spraying method.

14. A bearing ring comprising:

a body with an outer face, two opposite side faces, a rounding formed between the outer face and each side face, and a bevel of the body of the bearing ring, the bevel running from each side face to an inner face of the bearing ring;

an electrically insulating coating carried by the outer face, the two opposite side faces, the rounding formed between the outer face and each side face, and the bevel running from each side face to an inner face of the body, wherein the insulating coating is made up of a ceramic layer with a plurality of particles and a plurality of pores between the particles; wherein the plurality of pores in the ceramic layer have a proportion between 10 and 50%; and a plastic material for filling the plurality of pores and for forming an additional coating on the ceramic layer.

* * * * *